US007061382B2

(12) United States Patent
Claessens et al.

(10) Patent No.: US 7,061,382 B2
(45) Date of Patent: *Jun. 13, 2006

(54) APPARATUS FOR ELECTRONICALLY VERIFYING THE AUTHENTICITY OF CONTENTS WITHIN A CONTAINER

(75) Inventors: Francis M. Claessens, Barkham Square Park, Barkham, Berkshire (GB) RG40 4PN; Timo W. Kipp, 29, Ovington Square, London (GB) SW3 1LG; John P. Palmer, Palm Beach Gardens, FL (US)

(73) Assignees: Francis M. Claessens, Berkshire (GB); Timo W. Kipp, Palm Beach, FL (US)

( * ) Notice: Subject to any disclaimer, the term of this patent is extended or adjusted under 35 U.S.C. 154(b) by 6 days.

This patent is subject to a terminal disclaimer.

(21) Appl. No.: 10/734,813

(22) Filed: Dec. 12, 2003

(65) Prior Publication Data

US 2005/0128087 A1    Jun. 16, 2005

(51) Int. Cl.
  *G08B 13/14* (2006.01)
(52) U.S. Cl. ............................. 340/572.8; 340/572.7; 215/901; 215/250; 343/720; 343/873
(58) Field of Classification Search ................ 343/873, 343/872, 900, 700 MS, 720; 340/568.1, 340/572.1, 572.7, 572.8, 572.9; 215/250–252, 215/901, 44
  See application file for complete search history.

(56) References Cited

U.S. PATENT DOCUMENTS

| 3,847,295 | A | * | 11/1974 | Taylor | 215/44 |
|---|---|---|---|---|---|
| 4,686,516 | A | | 8/1987 | Humphrey | 340/572.3 |
| 4,711,368 | A | | 12/1987 | Simons | 340/572.1 |
| 4,813,564 | A | | 3/1989 | Cooper et al. | 340/572.5 |
| 4,825,801 | A | | 5/1989 | Weber | 340/572.1 |
| 5,566,441 | A | | 10/1996 | Marsh et al. | 29/600 |
| 5,602,530 | A | | 2/1997 | Holmgren | 340/572.1 |
| 5,786,626 | A | | 7/1998 | Brady et al. | 343/873 |
| 5,850,186 | A | | 12/1998 | Min | 340/7.44 |
| 5,880,675 | A | | 3/1999 | Trautner | 340/572.8 |
| 5,887,176 | A | | 3/1999 | Griffith et al. | 713/320 |
| 5,953,682 | A | | 9/1999 | McCarrick et al. | 702/45 |
| 6,031,457 | A | | 2/2000 | Bonkowski et al. | 340/572.1 |
| 6,050,622 | A | | 4/2000 | Gustafson | 340/572.1 |
| 6,069,955 | A | | 5/2000 | Coppersmith et al. | 380/54 |

(Continued)

FOREIGN PATENT DOCUMENTS

EP    0 619 243 B1    10/1994

(Continued)

*Primary Examiner*—Hoang V. Nguyen
*Assistant Examiner*—Ephrem Alemu
(74) *Attorney, Agent, or Firm*—Amster, Rothstein & Ebenstein LLP

(57) ABSTRACT

An apparatus for detecting the authenticity of a container sealed with a cap (or other closure) which automatically disables itself when the cap is first removed. A radio frequency identification (RFID) tag includes a substrate, a radio frequency transceiver circuit mounted upon the substrate and connected to an antenna having a fixed length that is also mounted upon the substrate, and a protrusion affixed to or a slot in the substrate. A cap for a container includes the RFID tag mounted on an inner surface adjacent to the closed end. When mounted on the container, the cap mates with a ratchet wheel connected to the container that engages the protrusion or slot such that removing the cap from the container will cause the substrate to fracture and thereby cause the RFID tag to become permanently disabled.

3 Claims, 8 Drawing Sheets

U.S. PATENT DOCUMENTS

| | | | | |
|---|---|---|---|---|
| 6,137,413 A | 10/2000 | Ryan, Jr. | | 340/572.8 |
| 6,147,606 A * | 11/2000 | Duan | | 343/873 |
| 6,162,550 A | 12/2000 | Pinchen et al. | | 340/572.1 |
| 6,206,292 B1 * | 3/2001 | Robertz et al. | | 235/488 |
| 6,226,619 B1 * | 5/2001 | Halperin et al. | | 705/1 |
| 6,255,948 B1 | 7/2001 | Wolpert et al. | | 340/572.8 |
| 6,271,753 B1 | 8/2001 | Shukla | | 340/571 |
| 6,360,208 B1 * | 3/2002 | Ohanian et al. | | 705/31 |
| 6,483,473 B1 | 11/2002 | King et al. | | 343/767 |
| 6,501,435 B1 | 12/2002 | King et al. | | 343/795 |
| 6,549,131 B1 | 4/2003 | Cote et al. | | 340/572.1 |
| 6,556,139 B1 | 4/2003 | Manov et al. | | 340/572.1 |
| 6,641,052 B1 | 11/2003 | Baillod et al. | | 40/311 |
| 2001/0017817 A1 * | 8/2001 | De La Huerga | | 368/10 |
| 2001/0035815 A1 | 11/2001 | Fletcher et al. | | 340/10.2 |
| 2002/0031997 A1 | 3/2002 | Lawler, Jr. et al. | | 452/173 |
| 2002/0057201 A1 | 5/2002 | Manov et al. | | 340/572.1 |
| 2002/0067267 A1 | 6/2002 | Kirkham | | 340/572.7 |
| 2002/0175818 A1 | 11/2002 | King et al. | | 340/572.8 |
| 2003/0047530 A1 | 3/2003 | Durbin | | 340/568.1 |

FOREIGN PATENT DOCUMENTS

| | | |
|---|---|---|
| EP | 1 083 519 A2 | 3/2001 |
| FR | 2 703 659 A1 | 10/1994 |
| JP | 2002181296 A | 6/2002 |
| JP | 2002185358 A | 6/2002 |
| WO | WO 00/02661 | 1/2000 |
| WO | WO 00/54724 | 9/2000 |
| WO | WO/ 01/51369 A1 | 7/2001 |
| WO | WO 02/13135 A2 | 2/2002 |
| WO | WO 02/095671 A1 | 11/2002 |
| WO | WO 03/023705 A1 | 3/2003 |
| WO | WO 03/023706 | 3/2003 |

* cited by examiner

US 7,061,382 B2

APPARATUS FOR ELECTRONICALLY VERIFYING THE AUTHENTICITY OF CONTENTS WITHIN A CONTAINER

FIELD OF THE INVENTION

The invention relates generally to an apparatus that electronically verifies the authenticity of the contents within a container sealed with a cap or other closure, such as a bottle, and which automatically disables itself when first opened.

BACKGROUND OF THE INVENTION

Many types of valuable consumer products are produced surreptitiously by counterfeit producers and inserted at some point into the legitimate supply chain. The alcoholic beverage industry is especially plagued by counterfeit producers. The legitimate suppliers of the packaging for these products have been unable to produce, at reasonable cost, packaging which cannot be reproduced by the counterfeiters. Consequently, counterfeit goods are virtually indistinguishable from the legitimate goods without directly examining the contents of such goods, which requires actually opening the packaging of such goods. In the case of most goods, and especially beverages and other foodstuffs, opening the packaging renders the goods worthless since they can not be resold.

It is anticipated that radio frequency identification ("RFID") devices (commonly called "RFID tags") will soon replace bar codes as the chief way to identify goods. An RFID tag is pre-encoded to include information about the associated product to which it is attached or to contain a distinctive identification code. When an RFID tag is interrogated by an external reader, it will provide a radio signal containing that pre-encoded data. Thus, for example, a code can be encoded within the RFID tag that defines the product during checkout and this information can be read (instead of a bar code) to determine the type of good and calculate its price (which is either also encoded in the RFID tag or stored in a main database and obtained based upon the product code). However, a great deal of concern has arisen recently relative to privacy issues because conventional RFID tags continue to be active long after a product has been purchased. This means that third parties can continue to read the information in the RFID tag for the life of the product, for example, allowing these third parties to generate information about a person's shopping tendencies without their knowledge.

As a result, although RFID tags can be used to distinguish between legitimate goods and counterfeit goods because the counterfeit goods will not include valid RFID tags because of the difficulty in reproducing RFID tags, the use of such RFID tags on goods is likely to raise privacy concerns if the RFID tag remains active for the life of the product.

It is therefore an object of the present invention to provide an improved apparatus and method for verifying the authenticity of the contents of a container which can not be easily duplicated by counterfeiters and which is permanently disabled upon the opening of the container for the first time.

It is a further object of the present invention to provide an improved apparatus and method for verifying the authenticity of the contents of a container which can also be permanently disabled electronically.

SUMMARY OF THE INVENTION

The present invention is an apparatus for use in detecting the authenticity of a container sealed with a cap or other closure. The apparatus comprises a radio frequency identification tag that includes a radio frequency transceiver circuit adapted to transmit a signal upon receipt of a transmit command and mounted upon a substrate. The radio frequency identification tag is mounted on an inner surface of a cap for a container. An engagement member interconnects the substrate and the container such that removing the cap from the container results in the fracture of the substrate thereby causing the radio frequency identification tag to become permanently disabled.

In accordance with a presently preferred embodiment of the present invention, the apparatus comprises a radio frequency identification tag comprising a substrate, a radio frequency transceiver circuit adapted to transmit a signal upon receipt of a transmit command and mounted upon the substrate, an antenna having a fixed length mounted upon the substrate and connected to the radio frequency transceiver circuit, and a first interconnection means affixed to the substrate. The apparatus further contains a cap for the container having a cylindrical portion, a closed end of the cylindrical portion and an open end of the cylindrical portion, the radio frequency identification tag mounted on an inner surface of the cylindrical portion of the cap adjacent to the closed end such that the first interconnection means faces centrally inward. Finally, the apparatus contains a second interconnection means mounted on the container for engaging the first interconnection means when the cap is installed on the container such that removing the cap from the container will exert force on the substrate resulting in the fracture of the substrate thereby causing the radio frequency identification tag to become permanently disabled.

BRIEF DESCRIPTION OF THE DRAWINGS

These and other objects and advantages of the invention, as well as the details of the illustrative embodiments, will be more fully understood by reference to the following portion of the specification, taken in conjunction with the accompanying drawings, in which.

DETAILED DESCRIPTION OF THE PREFERRED EMBODIMENTS

The present invention relates to an apparatus for verifying the authenticity of the contents of a container, and is based upon the inclusion of an RFID tag with the container. The RFID tag contains an electronic code which may include identification of the contents as well as other information relevant to supply chain operations and is not visible from outside the product package. An interrogator is used to communicate with the RFID tag and may be a portable hand-held device or may be built into a computer, cash register, security exit, or the like. Whereas large counterfeiting operations in various countries are able to manufacture bottles, bottle caps, plastic bottle inserts, and labels that closely resemble authentic packaging; those same counterfeiting operations cannot afford the cost of developing the small, highly integrated radio chip that is inside the RFID tag. The RFID system may work at any of a variety of radio frequencies; however, the microwave frequency 2.45 Gigahertz is presently preferred because its smaller wavelength results in a shorter antenna and thus a smaller tag than lower frequency RFID tags. In addition, this microwave frequency has the advantage of being approved in most countries of the world for RFID applications. Furthermore, RFID devices that operate at 2.45 GHz are produced and marketed by several companies worldwide. Finally, the use of the spread-spectrum communications protocol and special code strategies for the information stored in the RFID tags effectively blocks counterfeiters from inserting counterfeit or black-market RFID tags into the electronic bottle caps (or other closures) that will be read and accepted by specific RFID interrogators as specified by legitimate organizers of the supply chain. Preferably, the RFID tag is mounted in the container cap and when the cap is installed on the container, there is an interconnection between the cap and the container such that when the cap is first removed from the container, the RFID tag is disabled.

Figure 1A:
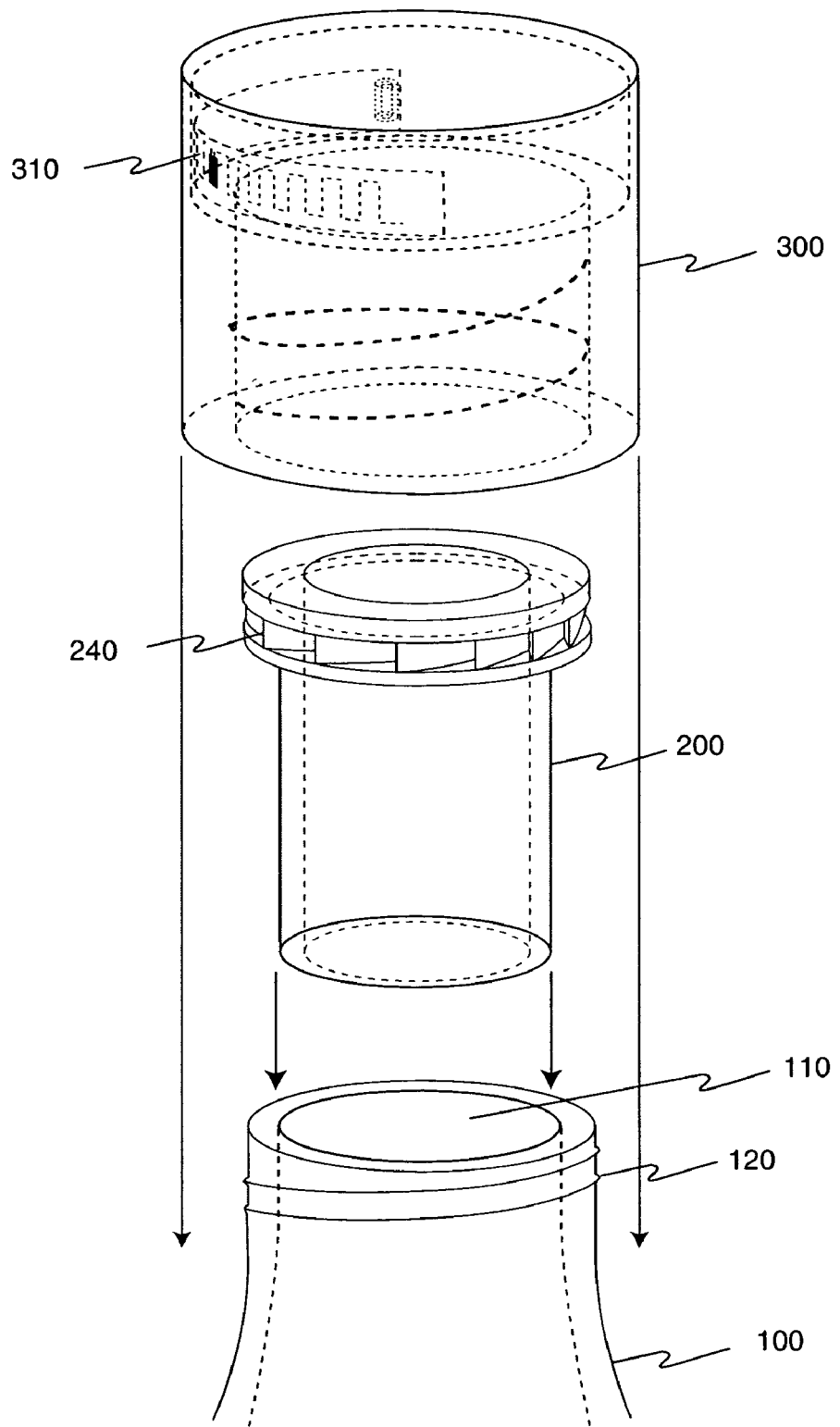
FIG. 1A is a perspective exploded view.
Figure 1B:
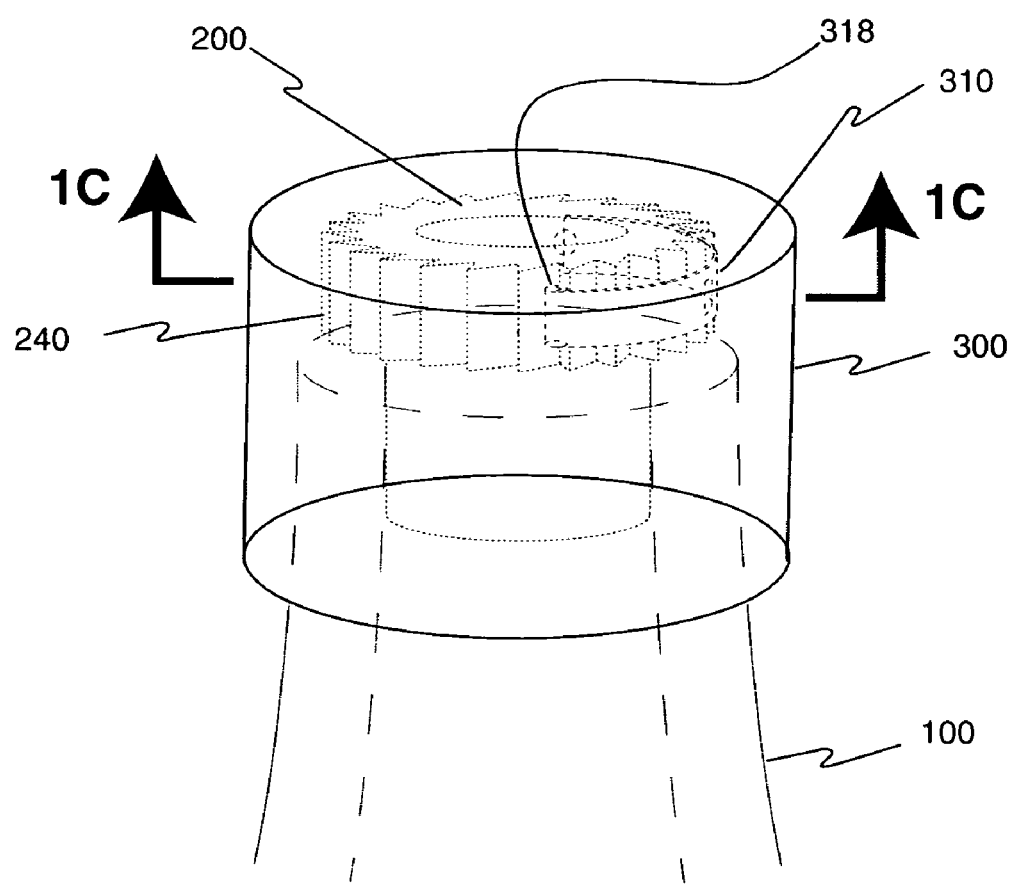
FIG. 1B is a perspective view and FIG. 1C is a cross-sectional view of the apparatus according to the present invention.
Figure 1C:
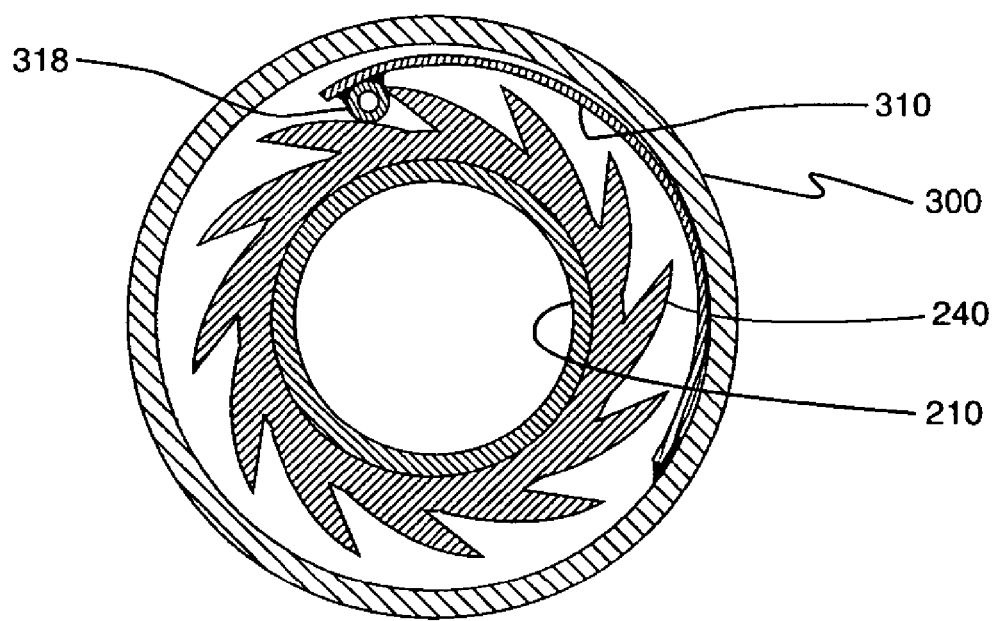

FIG. 1A is an exploded perspective view, FIG. 1B is a perspective view and FIG. 1C is a cross-sectional view of a presently preferred embodiment of the present invention. A bottle 100 includes threads 120 for securing a bottle cap over mouth 110 thereof. According to this presently preferred embodiment of the invention, bottle 100 is fitted with a tubular, preferably plastic, bottle insert 200, that is tightly fitted into the mouth 110 of bottle 100. Bottle insert 200 includes a ratchet wheel 240. Thereafter, bottle 100 is fitted with a cap 300, also preferably of plastic, that screws onto threads 120. Cap 300 includes an RFID tag 310 mounted near the closed end of cap 300 such that it is longitudinally aligned with the ratchet wheel 240 when cap 300 is screwed tightly onto bottle 100, with a cylindrical catch 318 mounted on RFID tag 310 interlocked with one of the plurality of ratchets on ratchet wheel 240 (as specifically shown in FIG. 1B).

Figure 2C:
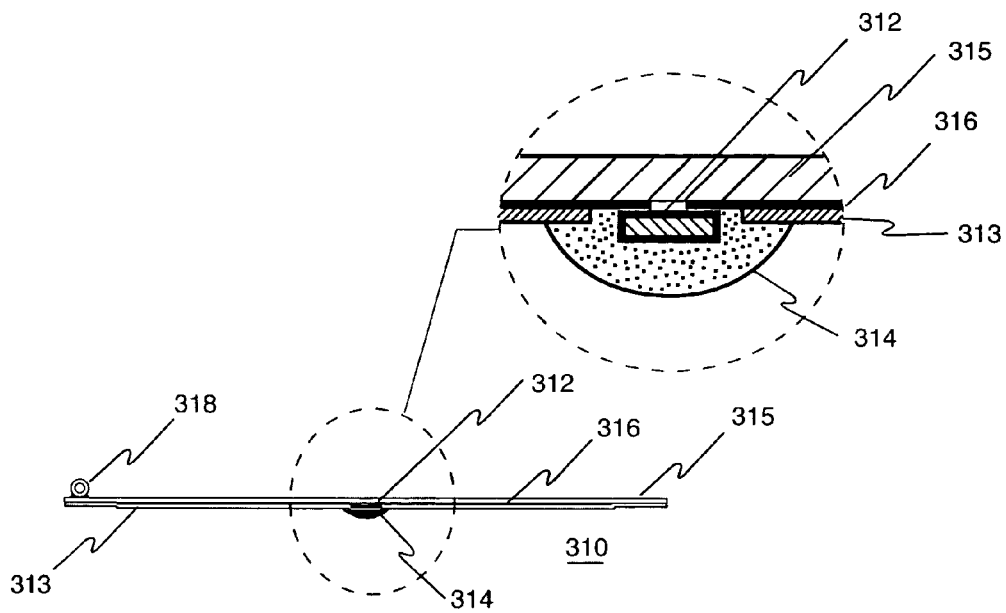
FIGS. 2A, 2B and 2C are front, top and side views, respectively, of the RFID tag of the present invention.
Figure 2B:
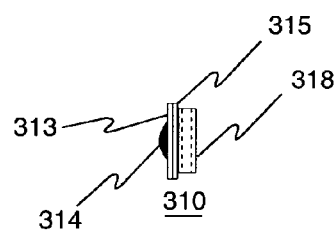
Figure 2A:
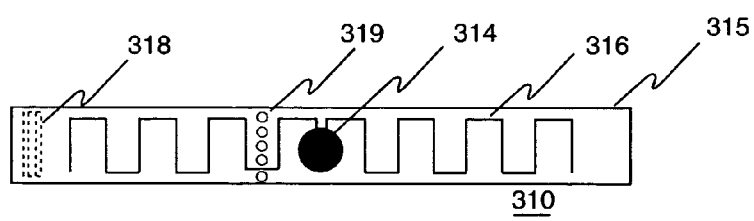

One embodiment of an RFID tag 310 adapted for use in the present invention is shown in FIGS. 2A, 2B and 2C. As shown in FIG. 2A, the main electronic components of RFID tag 310 include a radio frequency integrated circuit (RFIC) 312 and an antenna 316. Antenna 316 is preferably a copper pattern consisting of two portions, although those of skill in the art will recognize that other materials and patterns may be used. Each portion of antenna 316 is bonded to a thin semi-flexible substrate 315 which, preferably, is composed of a type of fiberglass that is non-absorptive of the radio signal. RFIC 312 typically is attached directly to the antenna using a "flip chip" process that is well known to those of skill in the art of integrated circuit fabrication technology. Although not shown in FIG. 2A, as shown in FIGS. 2B and 2C, RFIC 312 is protectively supported by an epoxy coating 314. In addition, as shown in FIGS. 2B and 2C, the top surface of RFID tag 310 is preferably laminated with a plastic coating 313 to protect antenna 316. Such RFIC chips mounted on a substrate and sufficiently small for use in the present invention are currently marketed by several vendors, e.g., Intermec Technologies Corporation, Alien Technology Corporation, SCS Corporation, and Hitachi Ltd. Preferably, the RFID tag selected for use includes the capability to be permanently disabled by receipt of a command from an external communicator, so that, for example, the RFID tag can be disabled at checkout. As stated above, the smallest RFID tags operate at the 2.45 GHz radio frequency, which is accepted by most countries of the world for RFID applications.

In accordance with the invention, as shown in FIG. 2A, a lateral perforation 319 is provided near RFIC 312 so that if both ends of RFID tag 310 are pulled in opposite directions with sufficient tension, RFID tag 310 will tear at lateral perforation 319, thereby separating a significant part of the antenna 316 from RFIC 312. This separation renders RFID tag 310 permanently inoperable. Perforation 319 in RFID tag 310 may be off-center, as it is shown in FIG. 2A. Alternatively, in configurations where RFID chip 312 is mounted in a hole (not shown) in the substrate 315 of RFID tag 310, perforation 319 is unnecessary because the hole provided for RFIC 312 will be the weakest point mechanically of RFID tag 310 when no perforation 319 is present. RFID tag 310 will thus naturally fracture at the location of RFIC 312 in this configuration. This fracture location, at RFIC 312, is presently preferred because it results in more complete disablement of RFID tag 310 since there will no connection whatsoever to at least one of the two portions of antenna 316. In addition, with this configuration, it is also possible that when the RFID tag 310 is damaged by opening the bottle, RFIC 312 could be damaged also contributing to the permanent disablement of the RFID tag 310.

In a presently preferred embodiment, RFID tag 310 further includes a protrusion in the form of a cylindrical catch 318 that is bonded close to an end thereof. Preferably, cylindrical catch 318 is bonded to RFID tag 310 on the side opposite to the side on which antenna 316 is mounted. Cylindrical catch 318 is preferably formed from a flexible material in a hollow tubular form. As discussed in more detail below, cylindrical catch 318 is part of the mechanism by which RFID tag 310 is mechanically disabled when bottle cap 300 is unscrewed from bottle 100 for the first time after being sealed at the bottling facility. In an alternative embodiment, RFID tag 310 includes a slot in substrate 315 instead of catch 318. The formation of the slot in this alternative embodiment is discussed in further detail below.

Figure 3B:
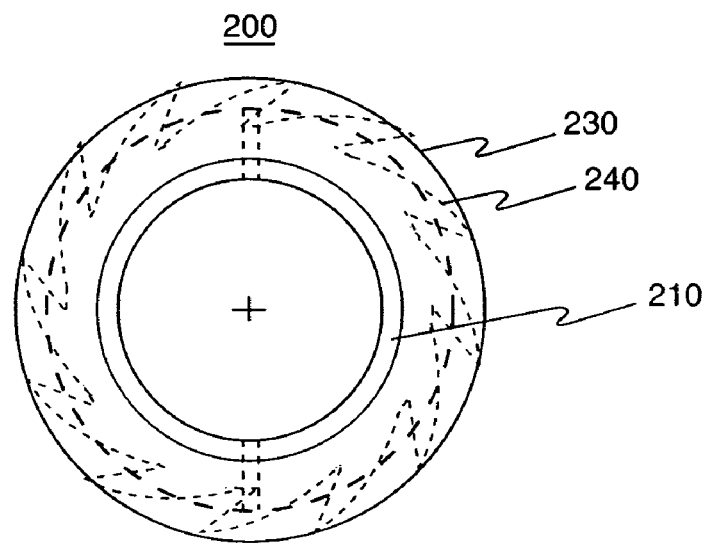
FIGS. 3A and 3B are side and top views, respectively, of the bottle insert assembly of the present invention.
Figure 3A:
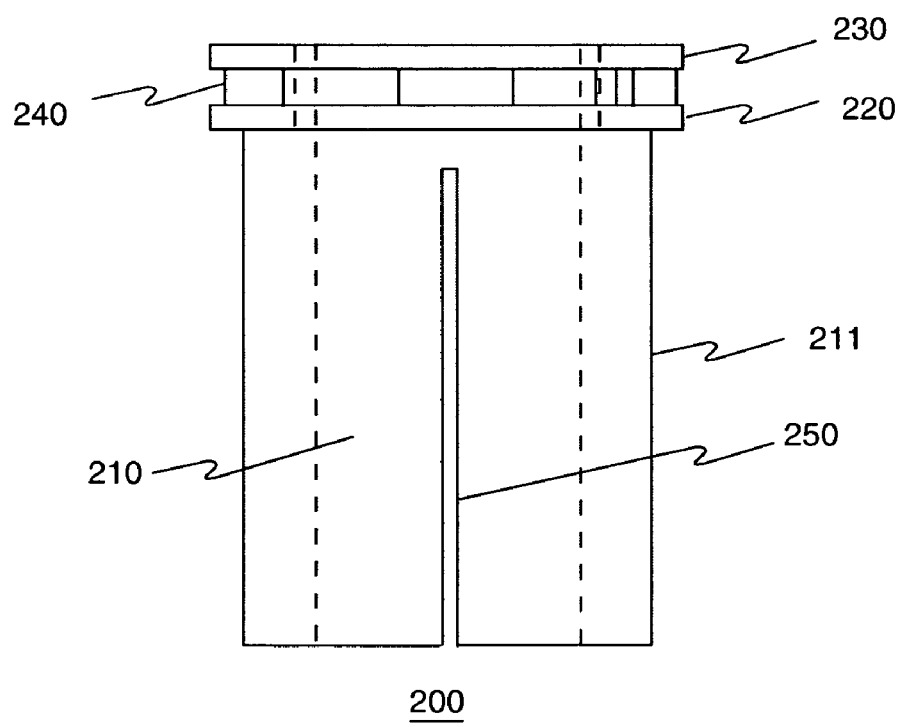
Figure 4D:
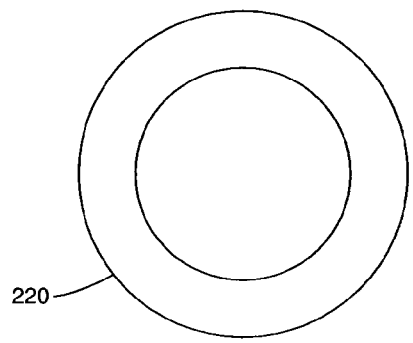
FIGS. 4C and 4D are side and top views of the plain disc portion of the bottle insert assembly of the present invention and FIGS. 4E and 4F are side and top views, respectively, of the ratchet wheel portion of the bottle insert assembly of the present invention.
Figure 4F:
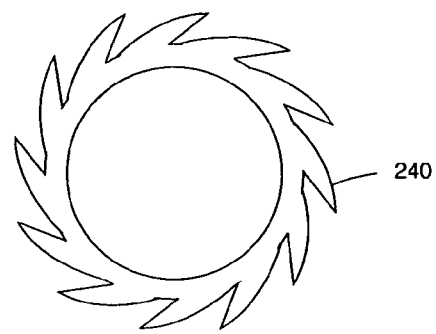
Figure 4C:
Figure 4E:
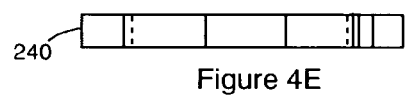
Figure 4B:
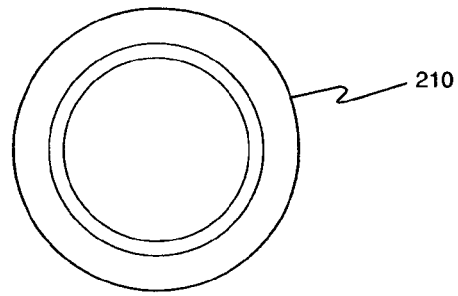
FIGS. 4A and 4B are side and top views of the central column portion of the bottle insert assembly of the present invention.
Figure 4A:
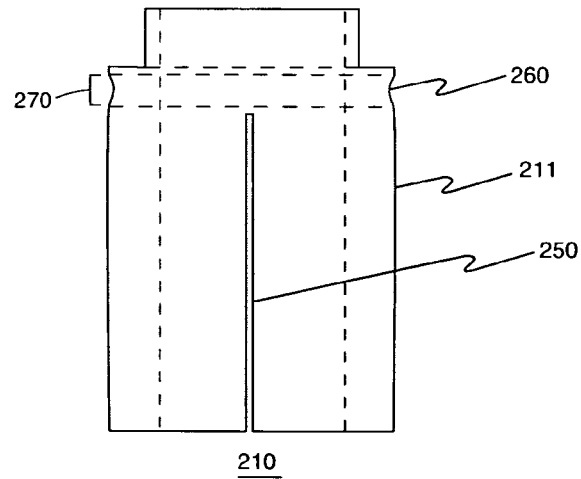

Referring now to FIGS. 3 and 4, bottle insert 200 includes a central column 210 having an outside diameter at the surface 211 that is large enough to cause a tight fit when it is pressed into bottle 100 (FIG. 1). It is necessary that the fit be sufficiently tight so as to prevent bottle insert 200 from rotating inside bottle 100 when cap 300 is removed for the first time. Optionally, one or more narrow longitudinal cuts 250 may be made through a wall of central column 260 to provide some stress relief as bottle insert 200 is pressed into bottle 100. Also, there may be two or more radial rib members (not shown) supporting the wall of central column 260 that allow it to flex locally as bottle insert 200 enters bottle 100, and then to expand as bottle insert 200 passes the narrowest diameter of mouth 110 of bottle 100. Since most bottles for alcoholic beverages are tapered on the inside, with the orifice being the smallest inside diameter, as seen in FIG. 4A, a shallow narrowing in the area 270 of central column 260 may preferably be provided to conform to the tapered orifice of bottle 100, thus providing increased friction between bottle insert 200 and bottle 100. As recognized by those of skill in the art, various other techniques may be used to ensure that bottle insert 200 fits tightly in mouth 110 of bottle 100.

Bottle insert 200 preferably includes two discs 220 and 230 and ratchet wheel 240 that are pressed or bonded onto the top end of the central column 260. Discs 220 and 230 fit on either side of ratchet wheel 240. Plain disc 220 is mounted below ratchet wheel 240 and acts as a spacer mechanism to separate ratchet wheel 240 from mouth 110 of bottle 100 and to provide a mechanical buffer that prevents damage to ratchet wheel 240 when bottle insert 200 is pressed into bottle 100. Upper plain disc 230 provides a pouring surface which may preferably be contoured to provide various improvements in pouring the contents from bottle 100, although these contours are not shown in FIGS. 3 and 4.

As one of skill in the art will readily recognize, although bottle insert 200 is shown as formed from four parts, bottle insert 200 may also be manufactured as a single molded part or the central column 210 may be combined with lower plain disc 220 and ratchet wheel 240 to form a single molded component to which top disc 230 is attached during assembly. Alternatively, as one of skill in the art will readily recognize, one or both of plain discs 220 and 230 may also be eliminated. In addition, it is possible that the ratchet wheel or other protrusions could be formed directly on bottle 100 between threads 120 and mouth 110.

Ratchet wheel 240 operates as a conventional ratchet wheel and provides a ratchet action in combination with the catch 318. Ratchet wheel 240 allows cap 300 to be twisted onto bottle 100, which conventionally has a right-handed thread 120, because catch 318 attached to the RFID tag 310 forces the serrations on ratchet wheel 240 inward. However, when an attempt is made to remove cap 300 from bottle 100, a counterclockwise torque will be applied to cap 300, pressing catch 318 against one of the serrations on ratchet wheel 240. As the torque is increased on cap 300, catch 318 will, in effect, pull on one end of RFID tag 310 while the opposite end of RFID tag 310 is permanently affixed to cap 300, eventually causing RFID tag 310 to break at perforation 319 (or, in the event that no perforation is provided, at the weakest point of substrate 316). As one of ordinary skill will readily recognize, the form and number of the ratchets on ratchet wheel 240 or other protrusions are not significant so long as they do not interact with substrate 315 when cap 300 is being installed on bottle 100 and interact with substrate 315 when cap 300 is being removed from bottle 100. In the alternative embodiment where RFID tag 310 includes a slot instead of catch 318, the ratchets on ratchet wheel 240 or other protrusions extend outward beyond the outer circumference of bottle 100 at mouth 110 such that the ratchets or other protrusions contact cap 300. In this alternative embodiment, the indentation on RFID tag 310 is formed so that the ratchets on ratchet wheel 240 or other protrusions pass over when cap 300 is being installed on bottle 100, but they do not pass over the indentation when cap 300 is being removed from bottle 100. In both embodiments, the result is the same, removal of cap 300 for the first time generates a lateral force along RFID tag 310 that results in the fracture of substrate 318 and total disablement of RFID tag 310.

Figure 5B:
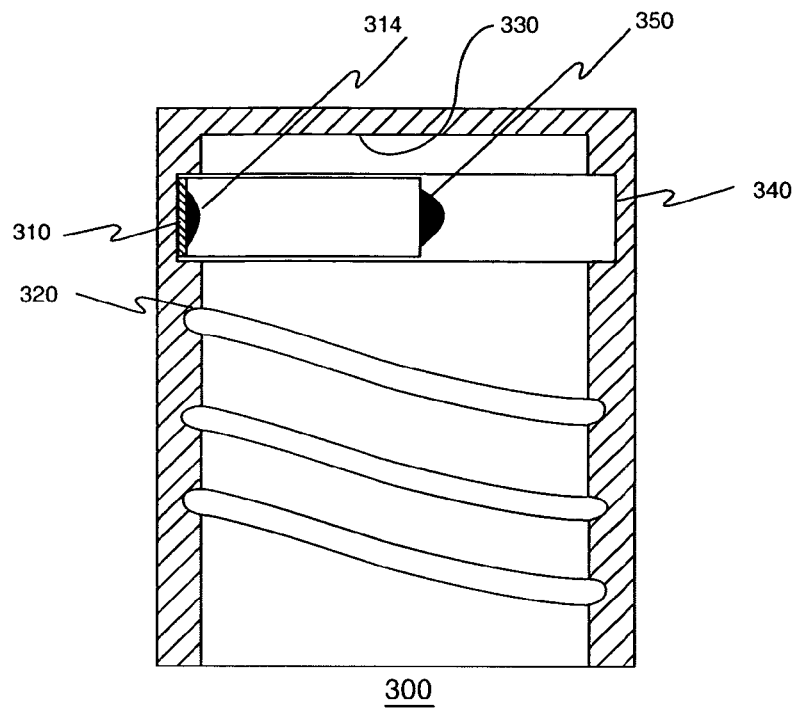
FIGS. 5A and 5B are bottom and side views of the bottle cap of the present invention.
Figure 5A:
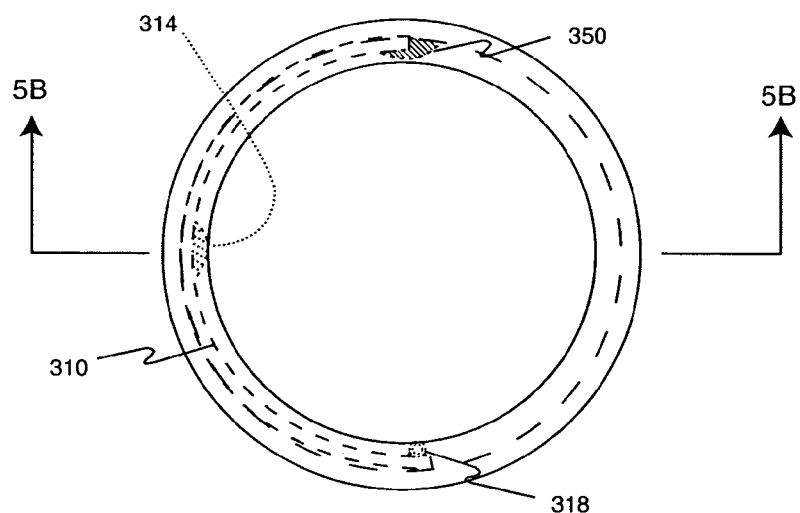

FIG. 5 shows how RFID tag 310 is mounted in cap 300. Cap 300 preferably includes a recess 340 between an end of internal thread 320 and the inside end 330. Recess 340 is only slightly wider than RFID tag 310. During manufacture of cap 300, RFID tag 310 is installed in recess 340 and permanently affixed to cap 300 at an end 350 of RFID tag 310 opposite end at which catch 318 is mounted. RFID tag 310 is oriented upon installation such that as cap 300 is screwed onto bottle 100, the serrations on bottle insert 200 pass over catch 318 and also push RFID tag 310 into a slight compression against the walls of cap 300. When cap 300 is screwed tightly onto the bottle, the serrations on ratchet wheel 240 will line up longitudinally with the catch 318 on RFID tag 310. At some later time, when cap 300 is unscrewed from bottle 100 for the first time, the serrations on bottle insert 200 will snag on catch 318 as discussed above and the torque on cap 300 will apply a longitudinal force along the length of RFID tag 310, essentially stretching RFID tag 310 along its longitudinal axis and causing RFID tag 310 to break into two parts, either at perforation 319, if present, or at some other weak point of RFID tag 310, e.g., at the RFIC 312 mounting point. Breaking of RFID tag 310 into two parts will permanently disable RFID tag 310 because it will no longer be able to communicate due to a significant change in the characteristics of antenna 316.

Figure 6:
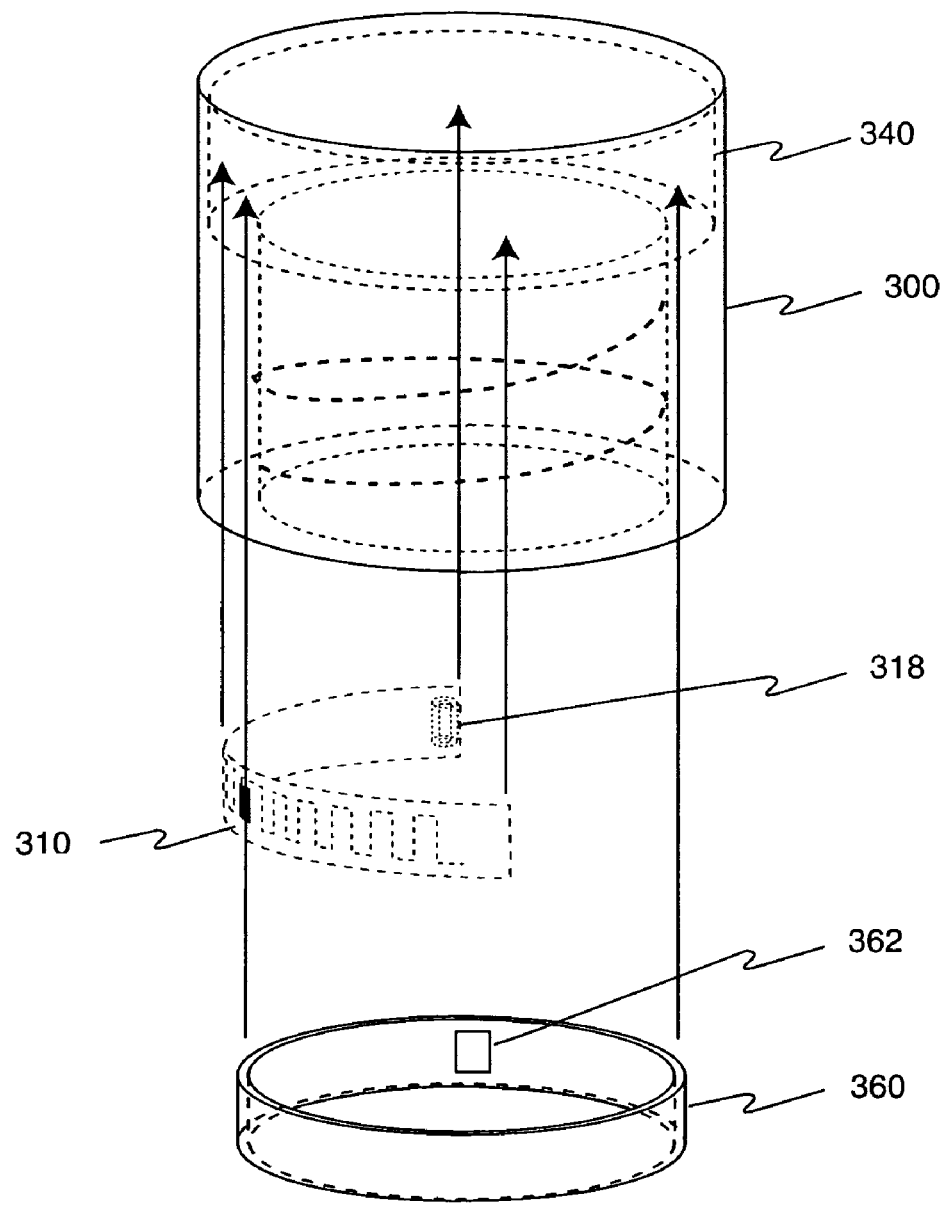
FIG. 6 is an exploded view of the bottle cap of the present invention.

As shown in FIG. 6, to prevent RFID tag 310 from falling loose from cap 300 as it is removed from bottle 100 (and possibly falling into the contents of bottle 100 if the throat of bottle insert 200 is not constricted), a thin, sliding band 360, preferably formed of plastic, may optionally be inserted inside cap 300 to cover RFID tag 310. This plastic band is not shown in FIGS. 1 and 5. Sliding band 360 includes a hole 362 that allows catch 318 (or the slot in the alternative embodiment) to engage the ratchet wheel 240. When cap 300 is removed and RFID tag 310 separates, e.g., at perforation 319, band 360 travels freely in groove 340 of cap 300 as it is dragged by catch 318 which protrudes through hole 362 in band 360. In this manner, RFID tag 310 remains behind band 360 and inside cap 300 upon opening of bottle 100 for the first time.

Although the present invention has been shown and described with respect to preferred embodiments, various changes and modifications can be made which lie within the spirit and scope of the invention. For example, those skilled in the art will recognize that many other forms of RFID structures could be used and that various types of structures can be used to provide an interconnection between the cap and container such that when the cap is first removed, the RFID tag will become disabled. Thus, numerous changes and modifications can be made while staying within the scope of the invention which is set forth in the appended claims.

We claim:

1. An apparatus for use in detecting the authenticity of a container sealed with a cap, comprising;

a radio frequency identification tag comprising a substrate, a radio frequency transceiver circuit adapted to transmit a signal upon receipt of a transmit command and mounted upon said substrate, an antenna having a fixed length mounted upon said substrate and connected to said radio frequency transceiver circuit, and a first interconnection means on said substrate;

a cap for a container having a cylindrical portion, a closed end of said cylindrical portion and an open end of said cylindrical portion, said radio frequency identification tag mounted on an inner surface of said cylindrical portion of said cap adjacent to said closed end such that said first connection means faces centrally inward; and a second interconnection means connected to said container for engaging said first interconnection means when said cap is installed on said container such that removing said cap from said container will exert force on said substrate resulting in the fracture of said substrate thereby causing said radio frequency identification tag to become permanently disabled.

2. An apparatus for use in detecting the authenticity of a container sealed with a cap, comprising;

a radio frequency identification tag comprising a substrate, a radio frequency transceiver circuit adapted to transmit a signal upon receipt of a transmit command and mounted upon said substrate, an antenna having a fixed length mounted upon said substrate and connected to said radio frequency transceiver circuit, and a protrusion affixed to said substrate;

a cap for a container having a cylindrical portion, a closed end of said cylindrical portion and an open end of said cylindrical portion, said radio frequency identification tag mounted on an inner surface of said cylindrical portion of said cap adjacent to said closed end such that said protrusion extends centrally inward; and ratcheting means connected to said container for engaging said protrusion when said cap is installed on said container such that removing said cap from said container will exert force on said substrate resulting in the fracture of said substrate thereby causing said radio frequency identification tag to become permanently disabled.

3. An apparatus for use in detecting the authenticity of a container sealed with a cap, comprising;

a radio frequency identification tag comprising a substrate, a radio frequency transceiver circuit adapted to transmit a signal upon receipt of a transmit command and mounted upon said substrate, an antenna having a fixed length mounted upon said substrate and connected to said radio frequency transceiver circuit, and a slot in said substrate;

a cap for a container having a cylindrical portion, a closed end of said cylindrical portion and an open end of said cylindrical portion, said radio frequency identification tag mounted on an inner surface of said cylindrical portion of said cap adjacent to said closed end such that said slot faces centrally inward; and ratcheting means connected to said container for engaging said slot when said cap is installed on said container such that removing said cap from said container will exert force on said substrate resulting in the fracture of said substrate thereby causing said radio frequency identification tag to become permanently disabled.

\* \* \* \* \*